United States Patent
Huang et al.

(10) Patent No.: US 10,206,246 B2
(45) Date of Patent: *Feb. 12, 2019

(54) OVERLAPPING BASIC SERVICE SET (OBSS) INDICATION IN A HIGH-EFFICIENCY WIRELESS LOCAL-AREA NETWORK (HEW)

(71) Applicant: Intel IP Corporation, Santa Clara, CA (US)

(72) Inventors: Po-Kai Huang, San Jose, CA (US); Robert J. Stacey, Portland, OR (US); Qinghua Li, San Ramon, CA (US)

(73) Assignee: Intel IP Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/918,051

(22) Filed: Mar. 12, 2018

(65) Prior Publication Data
US 2018/0220488 A1 Aug. 2, 2018

Related U.S. Application Data

(63) Continuation of application No. 14/927,821, filed on Oct. 30, 2015, now Pat. No. 9,949,317.
(Continued)

(51) Int. Cl.
*H04W 84/12* (2009.01)
*H04L 29/12* (2006.01)

(52) U.S. Cl.
CPC ......... *H04W 84/12* (2013.01); *H04L 61/2038* (2013.01); *H04L 61/2092* (2013.01); *H04L 61/6004* (2013.01); *H04L 61/6022* (2013.01)

(58) Field of Classification Search
None
See application file for complete search history.

(56) References Cited

U.S. PATENT DOCUMENTS 9,001,680 B2 * 4/2015 Koskela ............... H04W 48/16
                                                           370/241
9,949,317 B2 * 4/2018 Huang .................. H04W 84/12
(Continued)

OTHER PUBLICATIONS

"U.S. Appl. No. 14/927,821, Non Final Office Action dated Aug. 10, 2017", 18 pgs.
(Continued)

*Primary Examiner* — Ayaz R Sheikh
*Assistant Examiner* — Faiyazkhan Ghafoerkhan
(74) *Attorney, Agent, or Firm* — Schwegman Lundberg & Woessner, P.A.

(57) ABSTRACT

An apparatus, computer readable medium, and method for overlapping basic service set (OBSS) indication in a high-efficiency wireless local-area network (HEW). An apparatus of a high-efficiency wireless local-area network device is disclosed. The apparatus including transceiver circuitry and processing circuitry configured to receive a frame and determine whether the frame is a frame transmitted from a basic service set (BSS) or a frame transmitted from an OBSS based on one or more media access control (MAC) addresses of the frame. The MAC address may include an indication of a BSS of the HE wireless device. If the HE wireless device is an access point, then a second part of the MAC address may be a predetermined pattern, the second part of the MAC address may be a formula applied to a first part of the MAC address, or an individual/group bit of the MAC address may be set.

19 Claims, 6 Drawing Sheets

Related U.S. Application Data

(60) Provisional application No. 62/187,960, filed on Jul. 2, 2015.

(56) References Cited

U.S. PATENT DOCUMENTS

| | | | | |
|---|---|---|---|---|
| 2014/0016478 A1* | 1/2014 | Koskela | ............ | H04W 48/16 370/241 |
| 2014/0177546 A1* | 6/2014 | Kang | ............ | H04L 5/06 370/329 |
| 2014/0328268 A1* | 11/2014 | Zhu | ............ | H04W 74/002 370/329 |
| 2014/0328269 A1* | 11/2014 | Zhu | ............ | H04W 74/002 370/329 |
| 2014/0328270 A1* | 11/2014 | Zhu | ............ | H04W 74/002 370/329 |
| 2015/0063327 A1* | 3/2015 | Barriac | ............ | H04W 56/0005 370/337 |
| 2015/0078299 A1* | 3/2015 | Barriac | ............ | H04W 74/006 370/329 |
| 2015/0124744 A1* | 5/2015 | Zhu | ............ | H04W 72/1257 370/329 |
| 2015/0195777 A1* | 7/2015 | Koskela | ............ | H04W 48/16 370/338 |
| 2015/0282043 A1* | 10/2015 | Fang | ............ | H04W 52/241 370/329 |
| 2015/0312386 A1* | 10/2015 | Lee | ............ | H04L 69/22 370/338 |
| 2015/0359008 A1* | 12/2015 | Wang | ............ | H04W 74/004 370/330 |
| 2016/0128024 A1* | 5/2016 | Frederiks | ............ | H04W 72/04 370/329 |
| 2016/0142980 A1* | 5/2016 | Lee | ............ | H04L 5/0055 370/336 |
| 2016/0183243 A1* | 6/2016 | Park | ............ | H04W 72/0413 370/329 |
| 2016/0234879 A1* | 8/2016 | Kwon | ............ | H04W 72/0446 |
| 2016/0330663 A1* | 11/2016 | Zhou | ............ | H04W 4/025 |
| 2016/0345258 A1* | 11/2016 | Zhou | ............ | H04W 52/0206 |
| 2017/0006635 A1* | 1/2017 | Huang | ............ | H04W 74/0816 |
| 2017/0006661 A1* | 1/2017 | Huang | ............ | H04W 84/12 |
| 2017/0071009 A1* | 3/2017 | Huang | ............ | H04W 74/0808 |
| 2017/0142659 A1* | 5/2017 | Noh | ............ | H04W 52/0245 |
| 2017/0164406 A1* | 6/2017 | Son | ............ | H04W 74/08 |
| 2017/0170937 A1* | 6/2017 | Chun | ............ | H04L 5/0048 |

OTHER PUBLICATIONS

"U.S. Appl. No. 14/927,821, Notice of Allowance dated Dec. 5, 2017", 12 pgs.

"U.S. Appl. No. 14/927,821, PTO Response to Rule 312 Communication dated Mar. 14, 2018", 2 pgs.

"U.S. Appl. No. 14/927,821, Response filed Nov. 10, 2017 to Restriction Requirement dated Aug. 10, 2017", 9 pgs.

\* cited by examiner

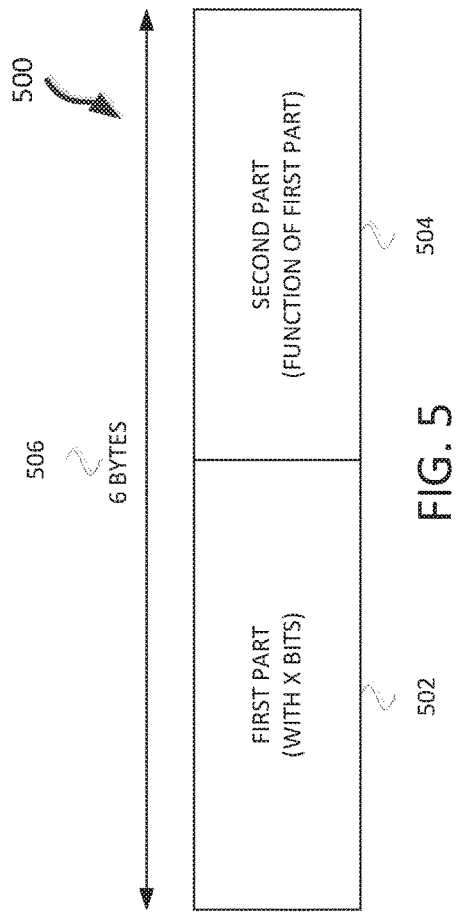
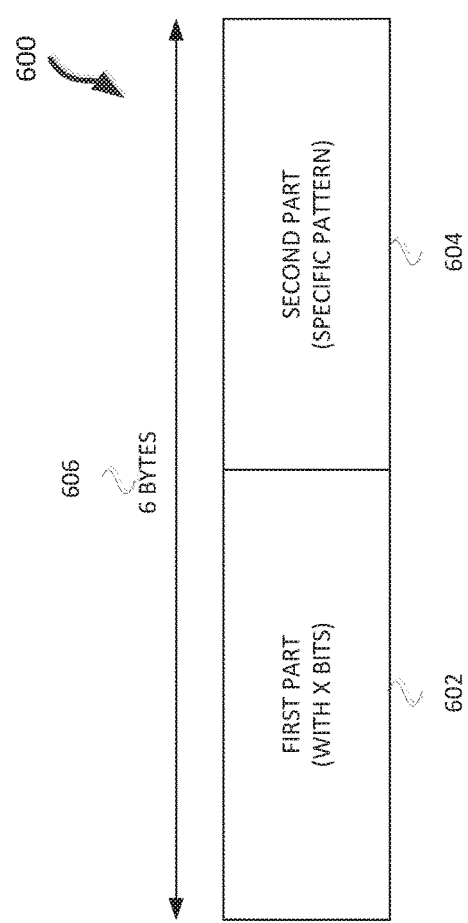

OVERLAPPING BASIC SERVICE SET (OBSS) INDICATION IN A HIGH-EFFICIENCY WIRELESS LOCAL-AREA NETWORK (HEW)

PRIORITY CLAIM

This application is a continuation of U.S. patent application Ser. No. 14/927,821, filed Oct. 30, 2015, which claims the benefit of priority under 35 USC 119(e) to U.S. Provisional Patent Application Ser. No. 62/187,960, filed Jul. 2, 2015, each of which is incorporated herein by reference in their entirety.

TECHNICAL FIELD

Some embodiments relate to wireless devices. Some embodiments relate to Institute of Electrical and Electronic Engineers (IEEE) 802.11. Some embodiments relate to IEEE 802.11ax. Some embodiments relate to determining whether a packet is from an overlapping basic service set (OBSS) or an intra basic service set (IBSS). Some embodiments relate to a media access control (MAC) header that indicates a BSSID.

BACKGROUND

Efficient use of the resources of a wireless local-area network (WLAN) is important to provide bandwidth and acceptable response times to the users of the WLAN. Moreover, wireless devices may need to operate with both newer protocols and with legacy device protocols, and may need to operate in range of more than one access point.

BRIEF DESCRIPTION OF THE DRAWINGS

The present disclosure is illustrated by way of example and not limitation in the figures of the accompanying drawings, in which like references indicate similar elements and in which:

FIG. 5 illustrates an indication that a MAC address is for a master station in accordance with some embodiments;

FIG. 6 illustrates an indication that a MAC address is for a master station in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
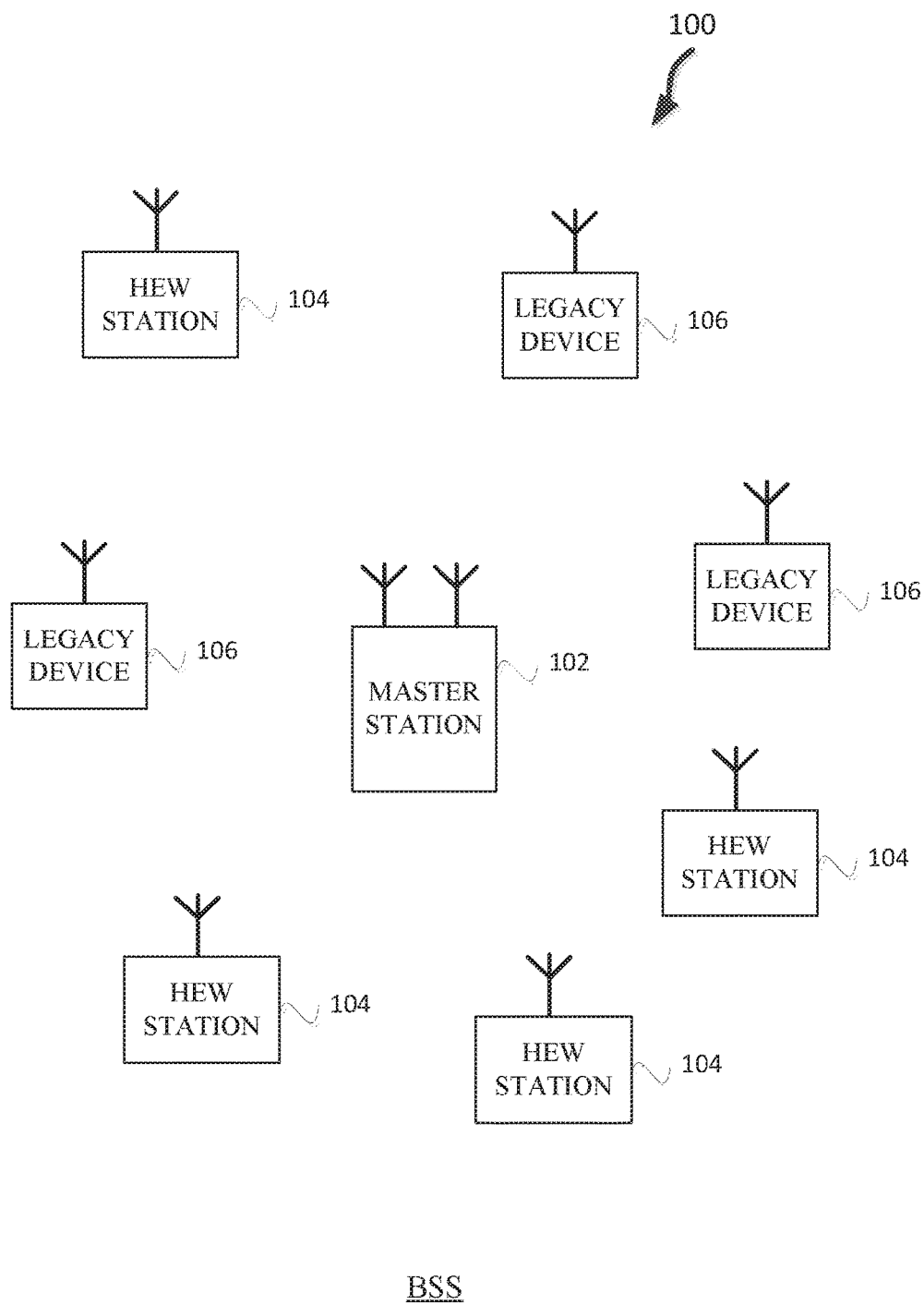
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11 ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-8.

Figure 2:
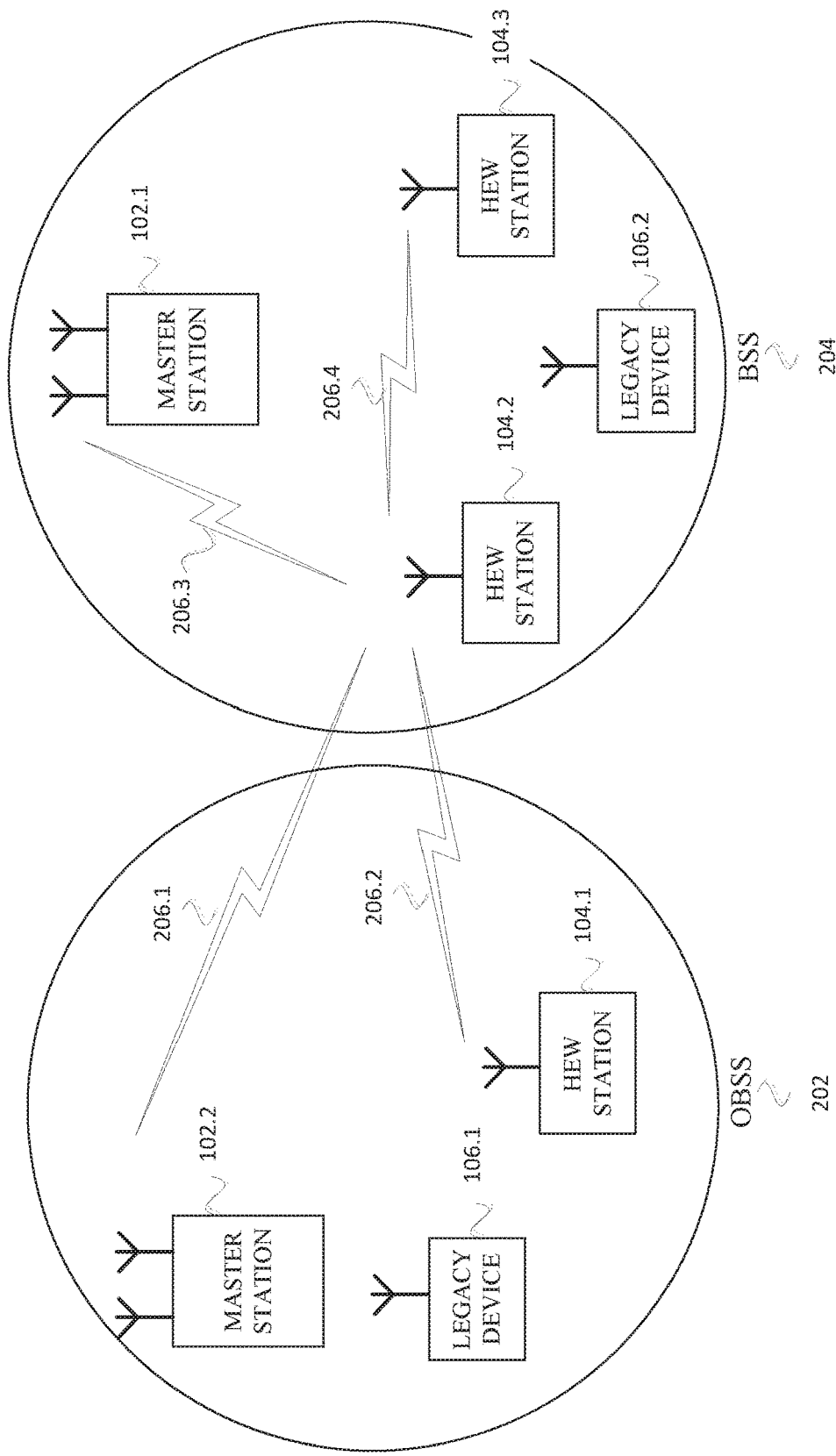
FIG. 2 illustrates a basic service set (BSS) and an overlapping basic service set (OBSS) in accordance with some embodiments.

FIG. 2 illustrates a basic service set (BSS) 204 and an overlapping basic service set (OBSS) 202 in accordance with some embodiments. Illustrated in FIG. 2 are an OBSS 202 and BSS 204. The OBSS 202 includes one or more master stations 102, one or more HEW stations 104, and one or more legacy devices 108. The HEW station 104.1 and legacy device 106.1 are associated with the master station 102.2. The master station 102.2 has an identification (not illustrated) for the OBSS 202, which may be termed a BSS identification (BSSID). In some embodiments, the identification is termed the color of the OBSS 202. The HEW station 104.1 stores a MAC address (see FIGS. 3, 4, and 5) of the master station 102.2. The OBSS 202 is a BSS 100. The OBSS 202 is termed an OBSS 202 to BSS 204 because some of the signals 206 overlap with the BSS 204.

The BSS 204 includes one or more master stations 102, one or more HEW stations 104.2, 104.3, and one or more legacy devices 106.2. The HEW stations 104.2 and 104.3 and legacy device 106.1 are associated with the master station 102.1. The master station 102.1 has an identification (not illustrated) for the BSS 204, which may be termed a BSSID. In some embodiments, the identification is termed the color of the BSS 204. The HEW stations 104.2 and 104.3 store a MAC address (see FIGS. 3, 4, and 5) of the master station 102.1.

Signal 206.1 is transmitted from the master station 102.2 and received by HEW station 104.2. Signal 206.2 is transmitted from HEW station 104.1 and received by HEW station 104.2. Signal 206.4 is transmitted from the HEW station 104.3 and received by HEW station 104.2. Signal 206.3 is transmitted by master station 102.1 and received by HEW station 104.2. The signals 206 may be packets transmitted by a master station 102, HEW station 104, legacy device 106, and/or another wireless device (not illustrated).

In some embodiments the HEW station 104 and/or master station 102 are configured to determine whether or not to use spatial re-use based on whether a signal 206 is from an OBSS 202 or BSS 204. The HEW station 104 determines whether the detected frame is an inter-BSS (OBSS 204, signals 206.1 and 206.2) or intra-BSS frame (BSS 204, signals 206.3 and 206.4) by using BSS color, which may be indicated in a physical header (e.g., SIG-A) or MAC address in the MAC header. If the detected frame is a inter BSS frame, under predetermined conditions, the HEW station 104 uses a predetermined a power detect level of the OBSS 202 that is greater than the minimum receive sensitivity level to determine whether or not the HEW station 104 may perform an action such as spatially reuse the resource the frame is using.

For example, HEW station 104.2 may receive signal 206.2 and if the signal is below a predetermined power detect level for OBSS 202, then the HEW station 104.2 may transmit a frame that overlaps the time signal 206.2 is transmitted and may use the same or an overlapping sub-channel as signal 206.2. The HEW stations 104 store the MAC address of the master stations 102.

There may be a technical problem of determining whether a packet is transmitted from a master station 102, HEW station 104, or legacy device 106 from an OBSS 202 or a BSS 204. Additionally, the HEW station 104 may not be able to determine whether a packet is transmitted from a master station 102, a HEW station 104, or legacy device 106. In some embodiments the color or BSSID is included in the packets.

Figure 3:
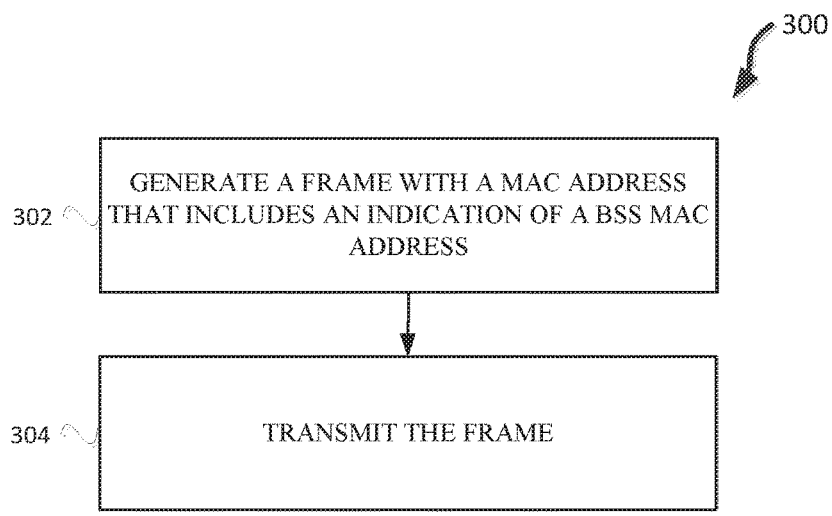
FIG. 3 illustrates a method of generating a frame with a MAC address that includes an indication of a BSS in accordance with some embodiments.

FIG. 3 illustrates a method 400 of generating a frame with a MAC address that includes an indication of a BSS in accordance with some embodiments. FIG. 3 is disclosed in conjunction with FIG. 4-6.

In some embodiments, the master station 102 generates a MAC address for the master station 102 that indicates the address is for a master station 102. For example, FIGS. 5 and 6 illustrate example embodiments where the MAC address indicates a MAC address is from a master station 102. This may be an indication of the BSS. For example, the HEW station 104 may then determine whether the frame is from the BSS the HEW station 104 is associated or an OBSS by comparing the MAC address with the address of the master station 102 the HEW station 104 is associated with. The master station 102 may set a locally administered bit in the MAC address to one to indicate that the master station 102 generated the MAC address.

FIG. 5 illustrates an indication that a MAC address 500 is for a master station in accordance with some embodiments. The MAC address 500 is six bytes 506 in accordance with some embodiments. The MAC address 500 is includes a first part 502 with X bits and a second part 504 that is a function of the first part 504. For example, the second part 504 may be a CRC of the first part 502. In other embodiments, the second part 504 is generated by a predetermined formula of the first part 502. A HEW station 104 may determine that the MAC address 500 is of a master station 102 if the CRC of the first part 502 matches the second part 504. The first part 502 will guarantee uniqueness for the MAC address 500 used by master station 102 for the BSS. The number of bits X is a predetermined number. There are 2^X number of MAC addresses 500 that can be used by the master station 102. Further, the probability for a master station 102, HEW station 104, or legacy device 106 to have a MAC address with this format is 2^X/2^48. When X is not too large, say 24, the probability is small, i.e., 0.000006%.

FIG. 6 illustrates an indication that a MAC address 600 is for a master station in accordance with some embodiments. The MAC address 500 is 6 bytes 506 in accordance with some embodiments. The MAC address 600 includes a first part 602 with X bits and a second part 604 that is a predetermined pattern. A HEW station 104 determines whether the MAC address 600 is of a master station 102 by comparing the second part 604 to a specific pattern (e.g., all ones). The probably for a master station 102, HEW station 104, or legacy device 106 to have a MAC address with this format is the same as determined for FIG. 5.

In some embodiments, if there is only one address in the frame such as a CTS frame and the address is to a master station 102, then the MAC address may have an individual/group bit set to one to indicate the MAC address is of a master station 102. The HEW station 104 may receive the CTS frame and determine the MAC address is of a master station 102 based on the individual/group bit being set to 1. The individual/group bit is then zeroed out to compare the MAC address in the CTS frame with the address of the master station 102 the HEW station 102 is associated with. The HEW station 102 can then determine if the CTS frame was transmitted from the BSS or an OBSS. The HEW stations 102 and/or legacy devices 106 are configured to not treat the MAC address with the individual/group bit set to 1 as a group frame in accordance with some embodiments.

Figure 7:
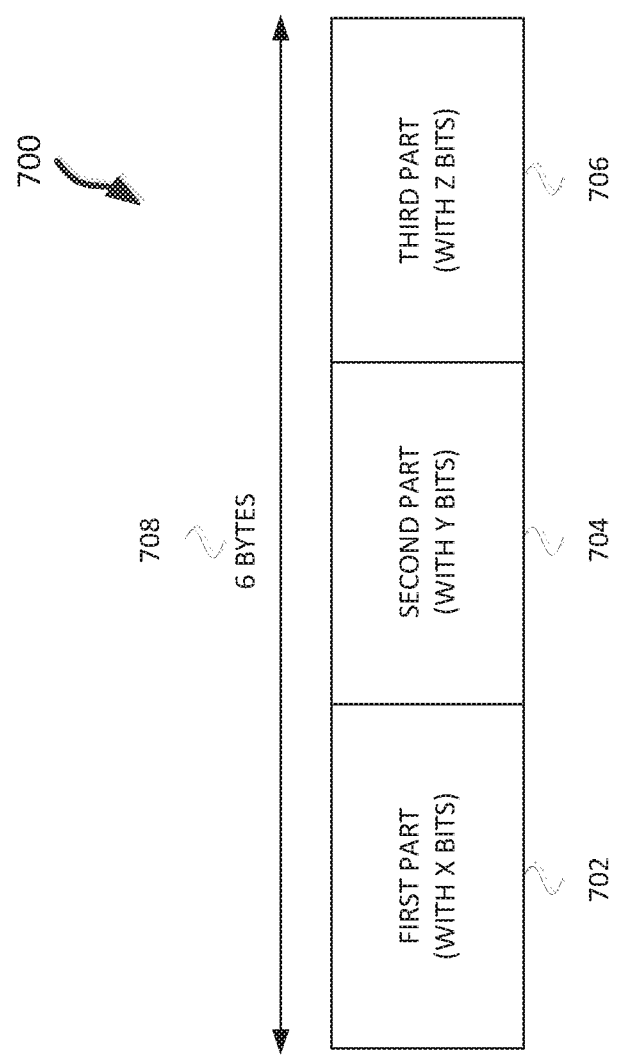
FIG. 7 illustrates a MAC address that includes an indication of a BSS in accordance with some embodiments.

FIG. 7 illustrates a MAC address 700 that includes an indication of a BSS in accordance with some embodiments. Illustrated in FIG. 7 is a first part 702, second part 704, and third part 706. The MAC address 700 is six bytes 708 in accordance with some embodiments. The first part 702 is used for uniqueness for the MAC address 700 with other neighborhood MAC addresses. The second part 704 indicates a color of the BSS or a BSSID. The third part 706 indicates that the MAC address 700 is an IEEE 802.11ax MAC address 700. The third part 706 may be the CRC of the first two parts or a specific pattern to indicate IEEE 802.11ax MAC address. A master station 102 and/or HEW station 104 may be configured to receive the MAC address 700 and use the third part 706 to see if the MAC address 700 is an IEEE 802.11ax MAC address 700. The master station 102 and/or HEW station 104 can then determine the BSS color or BSSID using the second part 704.

The master station 102 and/or master station 102 may then determine whether or not the color or BSSID is an intra BSS packet or an intra BSS packet (e.g., from a OBSS). The HEW station 104 store the color or BSSID of the master station 102 the HEW station 104 is associated with. In some embodiments, X is 24 bits, Y is 8 bits, and Z is 16 bits. Using this example, the probability of a legacy device 106 to choose an IEEE 802.11ax MAC address 700 is ½^(16). A neighborhood can sustain 2^24 MAC address, and there are 8 bits for color. In accordance with the MAC address 700 every MAC address 700 may indicate BSSID or color, and it is not limited to the MAC address of the master station 102.

In some embodiments, a master station 102 and/or HEW station 104 choose whether to use the specific MAC address 500, 600, 700, or not. In some embodiments, the master station 102 may signal to the HEW station 104 the type of MAC address 500, 600, 700 to use during association with the master station 102.

The method 300 may continue at operation 304 with transmitting the frame. The method 300 may end.

Figure 4:
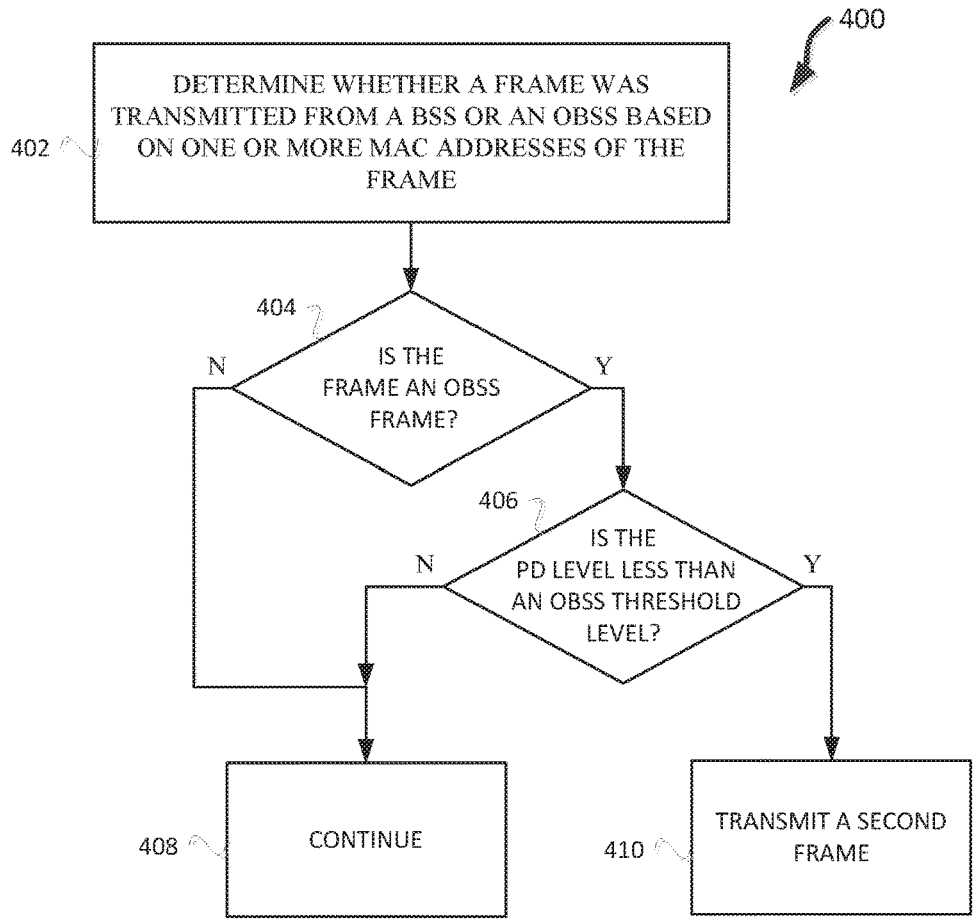
FIG. 4 illustrates a method for determining whether a frame was transmitted from a BSS or an OBSS based on one or more MAC addresses in accordance with some embodiments.

FIG. 4 illustrates a method 400 for determining whether a frame was transmitted from a BSS or an OBSS based on one or more MAC addresses in accordance with some embodiments. The method 400 begins as operation 402 with determining whether a frame was transmitted from a BSS or an OBSS based on one or more MAC addresses of the frame.

In some embodiments, the HEW station 104 may receive a frame with two MAC addresses a transmitter address (TA) and receiver address (RA). The HEW station 104 compares the TA address with a MAC address of the master station 102, with which the HEW station 104 is associated. If neither the TA nor the RA matches the MAC address of the master station 103 that the HEW station 104 is associated with, then the HEW station 104 concludes that the frame is from an OBSS 202.

In some embodiments, the HEW stations 104 and/or master stations 102 may be configured to refrain from treating the frame as an OBSS frame if the HEW station 104 and/or master station 102 cannot determine if a MAC address of the frame with only one MAC address is an address of a master station 102. Otherwise, if a HEW station 104 can determine that the MAC address is an address of a master station 102, then the HEW station 104 may then compare the MAC address of the frame with the address of the master station 102 with which the HEW station is associated. If they are different, then the HEW station 104 determines that it is an OBSS frame.

In some embodiments, the HEW station 104 may determine if the frame is from a master station 102 by determining if the MAC address is in accordance with the MAC address 500 disclosed in conjunction with FIG. 5. For example, the HEW station 104 may determine if the second part 504 is the function (e.g., CRC) of the first part 502. If the MAC address is of a master station 102, then the HEW station 104 may compare the MAC address with a MAC address of the master station 102 the HEW station 104 is associated with to determine whether the frame is a BSS frame or an OBSS frame.

In some embodiments, the HEW station 104 may determine if the frame is from a master station 102 by determining if the MAC address is in accordance with the MAC address 600 disclosed in conjunction with FIG. 6. For example, the HEW station 104 may determine if the second part 604 is the specific pattern. If the MAC address is of a master station 102, then the HEW station 104 may compare the MAC address with a MAC address of the master station 102 the HEW station 104 is associated with to determine whether the frame is a BSS frame or a OBSS frame.

In some embodiments, the HEW station 104 may receive a frame with only one address in the frame such as a CTS frame. The MAC address may have an individual/group bit set to one to indicate the MAC address is of a master station 102. The HEW station 104 may receive the CTS frame and determine the MAC address is of a master station 102 based on the individual/group bit being set to 1. The individual/group bit is then zeroed out to compare the MAC address in the CTS frame with the address of the master station 102 the HEW station 102 is associated with. The HEW station 102 can then determine if the CTS frame was transmitted from a BSS or an OBSS.

In some embodiments, the HEW station 104 may determine if the frame is from a master station 102 by determining if the MAC address is in accordance with the MAC address 700 disclosed in conjunction with FIG. 7. For example, the HEW station 104 may determine if the second part 604 indicates the MAC address 700 is an IEEE 802.11ax MAC address 700. And, then determine the color or BSSID from a third part 706. The HEW station 102 and/or master station 102 can then compare the color or BSSID of the BSS with which the HEW station 102 is associated, and determine if the frame is an intra BSS frame or an inter BSS frame (e.g., OBSS).

The method 400 continues at operation 404 with is the packet an OBSS frame. The HEW station 104 and/or master station 102 may determine whether the packet (or frame) is an OBSS frame by comparing a MAC address with the MAC address of the master station 102 that the HEW station 104 is associated with or directly if the MAC address 700 includes the color or BSSID.

If the HEW station 104 and/or master station 102 do not determine that the frame is an OBSS frame then the method 400 continues at operation 408 with continuing. For example, HEW station 104 and/or master station 102 may defer for the duration of the frame. The method 400 continues at operation 406 if the master station 102 and/or HEW station 104 determine that the frame is an OBSS frame. Operation 406 is determining if the PD level is less than an OBSS threshold level. If the PD is not less than an OBSS threshold level, then the method 400 continues at operation 408. If the PD level is less than an OBSS threshold level, then the method 400 continues at operation 410 with transmitting a second frame. For example, the master station 102 and/or HEW station 104 may spatially reuse the resource the first frame is using by transmitting a second frame that is concurrent with the first frame and overlaps the sub-channel the first frame is using. The operations 404 through 410 are optional. In some embodiments, the method 400 ends after operation 402 or 404. In some embodiments, the master station 102 and/or HEW device 104 may perform a different operation at operation 410. The method 400 may end.

Figure 8:
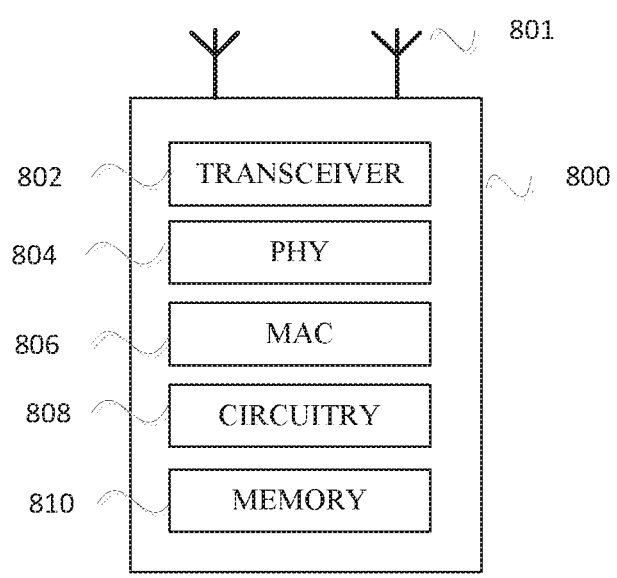
FIG. 8 illustrates a HEW device in accordance with some embodiments.

FIG. 8 illustrates a HEW device 800 in accordance with some embodiments. HEW device 800 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 800 may be suitable for operating as master station 102 (FIG. 1) or a HEW STA 104 (FIG. 1). In accordance with embodiments, HEW device 800 may include, among other things, a transmit/receive element 801 (for example an antenna), a transceiver 802, physical (PHY) circuitry 804, and media access control (MAC) circuitry 806. PHY circuitry 804 and MAC circuitry 806 may be HEW compliant layers and may also be compliant with one or more legacy IEEE 802.13 standards. MAC circuitry 806 may be arranged to configure packets such as a physical layer convergence procedure (PLCP) protocol data unit (PPDUs) and arranged to transmit and receive PPDUs, among other things. HEW device 800 may also include circuitry 808 and memory 810 configured to perform the various operations described herein. The circuitry 808 may be coupled to the transceiver 802, which may be coupled to the transmit/receive element 801. While FIG. 8 depicts the circuitry 808 and the transceiver 802 as separate components, the circuitry 808 and the transceiver 802 may be integrated together in an electronic package or chip.

In some embodiments, the MAC circuitry 806 may be arranged to contend for a wireless medium during a contention period to receive control of the medium for the HEW control period and configure an HEW PPDU. In some embodiments, the MAC circuitry 806 may be arranged to contend for the wireless medium based on channel contention settings, a transmitting power level, and a CCA level.

The PHY circuitry 804 may be arranged to transmit the HEW PPDU. The PHY circuitry 804 may include circuitry for modulation/demodulation, upconversion/downconversion, filtering, amplification, etc. In some embodiments, the circuitry 808 may include one or more processors. The circuitry 808 may be configured to perform functions based on instructions being stored in a RAM or ROM, or based on special purpose circuitry. The circuitry 808 may include processing circuitry and/or transceiver circuitry in accordance with some embodiments. The circuitry 808 may include a processor such as a general purpose processor or special purpose processor. The circuitry 808 may implement one or more functions associated with transmit/receive elements 801, the transceiver 802, the PHY circuitry 804, the MAC circuitry 806, and/or the memory 810.

In some embodiments, the circuitry 808 may be configured to perform one or more of the functions and/or methods described herein and/or in conjunction with FIGS. 1-8.

In some embodiments, the transmit/receive elements 801 may be two or more antennas that may be coupled to the PHY circuitry 804 and arranged for sending and receiving signals including transmission of the HEW packets. The transceiver 802 may transmit and receive data such as HEW PPDU and packets that include an indication that the HEW device 800 should adapt the channel contention settings according to settings included in the packet. The memory 810 may store information for configuring the other circuitry to perform operations for configuring and transmitting HEW packets and performing the various operations to perform one or more of the functions and/or methods described herein and/or in conjunction with FIGS. 1-8.

In some embodiments, the HEW device 800 may be configured to communicate using OFDM communication signals over a multicarrier communication channel. In some embodiments, HEW device 800 may be configured to communicate in accordance with one or more specific communication standards, such as the Institute of Electrical and Electronics Engineers (IEEE) standards including IEEE 802.11-2012, 802.11n-2009, 802.11 ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 800 may use 4× symbol duration of 802.11n or 802.11ac.

In some embodiments, an HEW device 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 801 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 800 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a wireless device. The apparatus comprising memory, and processing circuitry configured to: decode a frame and determine whether the frame is a frame transmitted from a basic service set (BSS) or a frame transmitted from an overlapping basic service set (OBSS) based on one or more media access control (MAC) addresses of the frame, wherein the apparatus is associated with the BSS.

In Example 2, the subject matter of Example 1 can optionally include where the processing circuitry is configured to determine the frame is the frame transmitted from the OBSS based on decoding a first portion of the frame; and if an energy threshold of the frame transmitted from the OBSS is below a threshold, cause to be transmitted an uplink frame that overlaps in time with a second portion of the frame, wherein the uplink frame is to be transmitted on a same sub-channel as the frame transmitted from the OBSS.

In Example 3, the subject matter of Example 1 or Example 2 can optionally include where a locally administered subfield of the frame is set to indicate the one or more MAC addresses are locally administered addresses, and wherein the processing circuitry is further configured to determine whether the frame is the frame transmitted from the BSS or the frame transmitted from the OBSS based on one of the following: an identification of the BSS or an identification of the OBSS in one of the one or more MAC addresses; or, an indication that one of the one or more MAC addresses is an address of an access point.

In Example 4, the subject matter of any of Examples 1-3 can optionally include where the processing circuitry is configured to compare a receiver address and a transmitter address of the frame with an address of an access point of the BSS, and determine the frame is the frame transmitted from the BSS if the receiver address or the transmitter address is the same as the address of the access point of the BSS, otherwise determine the frame is the frame transmitted from the OBSS frame, wherein the receiver address and the transmitter address are the one or more MAC addresses of the frame.

In Example 5, the subject matter of any of Examples 1-4 can optionally include where the processing circuitry is configured to: if a second part of a MAC address of the one or more MAC addresses is the same as a formula applied to a first part of the MAC address, determine that the MAC address is a first address of a first access point, and compare the first address of the first access point with a second address of a second access point of the BSS, and determine the frame is the BSS frame if the first address is the same as the second address, otherwise determine the frame is the OBSS frame.

In Example 6, the subject matter of Example 5 can optionally include where the formula is a cyclic redundancy code formula.

In Example 7, the subject matter of any of Examples 1-6 can optionally include where the processing circuitry is configured to: if a second part of a MAC address of the one or more MAC addresses is a predetermined pattern, determine that the MAC address is a first address of a first access point, and compare the first address of the first access point with a second address of a second access point of the BSS, and determine the frame is the BSS frame if the first address is the same as the second address, otherwise determine the frame is the OBSS frame.

In Example 8, the subject matter of any of Examples 1-7 can optionally include where the processing circuitry is further configured to: if a subfield of a MAC address of the one or more MAC addresses of the frame indicates the MAC address is an address of a first access point, determine that the MAC address is a first address of a first access point, and compare the first address of the first access point with a second address of a second access point of the BSS, and determine the frame is the BSS frame if the first address is the same as the second address, otherwise determine the frame is the OBSS frame.

In Example 9, the subject matter of Example 8 can optionally include where the subfield is one bit, and wherein the processing circuitry is configured to: set the subfield to zero; and set the first address to the MAC address.

In Example 10, the subject matter of Example 8 can optionally include where the subfield is a bit and the frame is a clear to send frame.

In Example 11, the subject matter of any of Examples 1-10 can optionally include where a MAC address of the one or more MAC addresses comprises a first subfield that comprises an identification of the BSS or the OBSS.

In Example 12, the subject matter of Example 11 can optionally include where the MAC address further comprises a second subfield that identifies the MAC address as an Institute of Electrical and Electronic Engineers (IEEE) 802.11ax MAC address and a third subfield, wherein at least two of the first subfield, the second subfield, and the third subfield are used as the IEEE 802.11ax MAC address, wherein the second subfield is a predefined pattern or a cyclic redundancy code (CRC) of the first subfield and the third subfield.

In Example 13, the subject matter of Example 11 can optionally include where the processing circuitry is configured to determine the frame is the frame transmitted from the BSS if the identification is of the BSS, otherwise determine the frame is the frame transmitted from the OBSS, wherein the identification is a color of the BSS or the OBSS.

In Example 14, the subject matter of any of Examples 1-13 can optionally include where the wireless device is at least one from the following group: a station, a master station, a high-efficiency local-area wireless network (HEW) station, a HEW master station, an Institute of Electrical and Electronic Engineers (IEEE) 802.11ax access point, and an IEEE 802.11ax station.

In Example 15, the subject matter of any of Examples 1-14 can optionally include one or more antennas coupled to the processing circuitry.

In Example 16, the subject matter of Example 15 can optionally include where the processing circuitry is further configured to receive the frame.

Example 17 is a non-transitory computer-readable storage medium that stores instructions for execution by one or more processors. The instructions are to configure the one or more processors to cause an apparatus to: receive a frame and determine whether the frame is a frame transmitted from a basic service set (BSS) or a frame transmitted from an overlapping basic service set (OBSS) based on one or more media access control (MAC) addresses of the frame.

In Example 18, the subject matter of Example 17 can optionally include where the instructions to further configure the one or more processors to cause the wireless device to: compare a receiver address and a transmitter address of the frame with an address of an access point of the BSS, and determine the frame is the frame transmitted from the BSS frame if the receiver address or the transmitter address is the same as the address of the access point of the BSS, otherwise determine the frame is the frame transmitted from the OBSS frame, wherein the receiver address and the transmitter address are the one or more MAC addresses of the frame.

In Example 19, the subject matter of Example 17 or 18 can optionally include where a MAC address of the one or more MAC addresses comprises a first subfield that comprises an identification of the BSS or the OBSS, and wherein the MAC address further comprises a second subfield that identifies the MAC address as an Institute of Electrical and Electronic Engineers (IEEE) 802.11ax MAC address and a third subfield comprising a portion of the MAC address.

Example 20 is an apparatus of a wireless device. The apparatus comprising memory, and processing circuitry configured to: generate a frame with a media access control (MAC) address of the wireless apparatus, wherein the MAC address indicates an identification of a basic service set (BSS) of the wireless device.

In Example 21, the subject matter of Example 20 can optionally include where the processing circuitry is further configured to: generate the frame with a second part of the MAC address is a predetermined pattern, the second part of the MAC address is a formula applied to a first part of the MAC address, or an individual/group bit of the MAC address is set, if the wireless device is an access point.

In Example 2, the subject matter of Examples 20 or 21 can optionally include one or more antennas coupled to the processing circuitry.

In Example 23, the subject matter of Example 22 can optionally include where the processing circuitry is further configured to: transmit the packet.

Example 24 is a method performed by a wireless device. The method including receiving a frame and determining whether the frame is a frame transmitted from a basic service set (BSS) or a frame transmitted from an overlapping basic service set (OBSS) based on one or more media access control (MAC) addresses of the frame.

In Example 25, the subject matter of Example 24 can optionally include comparing a receiver address and a transmitter address of the frame with an address of an access point of the BSS, and determining the frame is the frame transmitted from the BSS frame if the receiver address or the transmitter address is the same as the address of the access point of the BSS, otherwise determining the frame is the frame transmitted from the OBSS frame, wherein the receiver address and the transmitter address are the one or more MAC addresses of the frame.

Example 26 is a non-transitory computer-readable storage medium that stores instructions for execution by one or more processors. The instructions to configure the one or more processors to cause a wireless apparatus to: generate a frame with a media access control (MAC) address of the wireless apparatus, wherein the MAC address indicates an identification of a basic service set (BSS) of the wireless device.

In Example 27, the subject matter of Example 26 can optionally include where the instructions are to further configure the one or more processors to cause the wireless device to generate the frame with a second part of the MAC address is a predetermined pattern, the second part of the MAC address is a formula applied to a first part of the MAC address, or an individual/group bit of the MAC address is set, if the wireless device is an access point.

In Example 28, the subject matter of Examples 26 or 27 can optionally include where the instructions to further configure the one or more processors to cause the wireless device to transmit the packet.

Example 29 is a method performed by a wireless device. The method including generating a frame with a media access control (MAC) address of the wireless apparatus, wherein the MAC address indicates an identification of a basic service set (BSS) of the wireless device.

In Example 30, the subject matter of Example 26 can optionally include generating the frame with a second part of the MAC address is a predetermined pattern, the second part of the MAC address is a formula applied to a first part of the MAC address, or an individual/group bit of the MAC address is set, if the wireless device is an access point.

In Example 31, the subject matter of Examples 29 or 30 can optionally include transmitting the packet.

Example 32 is an apparatus of a wireless device. The apparatus comprising means for decoding a frame and determine whether the frame is a frame transmitted from a basic service set (BSS) or a frame transmitted from an overlapping basic service set (OBSS) based on one or more media access control (MAC) addresses of the frame, wherein the apparatus is associated with the BSS.

In Example 33, the subject matter of Example 32 can optionally include means for determining the frame is the frame transmitted from the OBSS based on decoding a first portion of the frame; and if an energy threshold of the frame transmitted from the OBSS is below a threshold, means for causing to be transmitted an uplink frame that overlaps in time with a second portion of the frame, wherein the uplink frame is to be transmitted on a same sub-channel as the frame transmitted from the OBSS.

In Example 34, the subject matter of Examples 32 or 33 can optionally include where a locally administered subfield of the frame is set to indicate the one or more MAC addresses are locally administered addresses, and further comprising: means for determining whether the frame is the frame transmitted from the BSS or the frame transmitted from the OBSS based on one of the following: an identification of the BSS or an identification of the OBSS in one of the one or more MAC addresses; or, an indication that one of the one or more MAC addresses is an address of an access point.

In Example 35, the subject matter of any of Examples 32-35 can optionally include means for comparing a receiver address and a transmitter address of the frame with an address of an access point of the BSS, and means for determining the frame is the frame transmitted from the BSS if the receiver address or the transmitter address is the same as the address of the access point of the BSS, otherwise means for determining the frame is the frame transmitted from the OBSS frame, wherein the receiver address and the transmitter address are the one or more MAC addresses of the frame.

In Example 36, the subject matter of any of Examples 32-36 can optionally include if a second part of a MAC address of the one or more MAC addresses is the same as a formula applied to a first part of the MAC address, means for determining that the MAC address is a first address of a first access point, and means for comparing the first address of the first access point with a second address of a second access point of the BSS, and means for determining the frame is the BSS frame if the first address is the same as the second address, otherwise means for determining the frame is the OBSS frame.

In Example 37, the subject matter of Example 36 can optionally include where the formula is a cyclic redundancy code formula.

In Example 38, the subject matter of any of Examples 32-37 can optionally include if a second part of a MAC address of the one or more MAC addresses is a predetermined pattern, means for determining that the MAC address is a first address of a first access point, and means for comparing the first address of the first access point with a second address of a second access point of the BSS, and means for determining the frame is the BSS frame if the first address is the same as the second address, otherwise determine the frame is the OBSS frame.

In Example 39, the subject matter of any of Examples 32-38 can optionally include if a subfield of a MAC address of the one or more MAC addresses of the frame indicates the MAC address is an address of a first access point, means for determining that the MAC address is a first address of a first access point, and means for comparing the first address of the first access point with a second address of a second access point of the BSS, and determine the frame is the BSS frame if the first address is the same as the second address, otherwise means for determining the frame is the OBSS frame.

In Example 40, the subject matter of Example 39 can optionally include where the subfield is one bit, and can further include means for setting the subfield to zero, and means for setting the first address to the MAC address.

In Example 41, the subject matter of Example 39 can optionally include where the subfield is a bit and the frame is a clear to send frame.

In Example 42, the subject matter of any of Examples 32-41 can optionally include where a MAC address of the one or more MAC addresses comprises a first subfield that comprises an identification of the BSS or the OBSS.

In Example 43, the subject matter of Example 42 can optionally include where the MAC address further comprises a second subfield that identifies the MAC address as an Institute of Electrical and Electronic Engineers (IEEE) 802.11ax MAC address and a third subfield, wherein at least two of the first subfield, the second subfield, and the third subfield are used as the IEEE 802.11ax MAC address, wherein the second subfield is a predefined pattern or a cyclic redundancy code (CRC) of the first subfield and the third subfield.

In Example 44, the subject matter of Example 42 can optionally include means for determining the frame is the frame transmitted from the BSS if the identification is of the BSS, otherwise means for determining the frame is the frame transmitted from the OBSS, wherein the identification is a color of the BSS or the OBSS.

In Example 45, the subject matter of any of Examples 32-44 can optionally include where the wireless device is at least one from the following group: a station, a master station, a high-efficiency local-area wireless network (HEW) station, a HEW master station, an Institute of Electrical and Electronic Engineers (IEEE) 802.11ax access point, and an IEEE 802.11ax station.

In Example 46, the subject matter of any of Examples 32-45 can optionally include means for transmitting and receiving radio frequency signals.

In Example 47, the subject matter of Example 46 can optionally include means for receiving the frame.

Example 48 is an apparatus of a wireless device. The apparatus comprising means for generating a frame with a media access control (MAC) address of the wireless apparatus, wherein the MAC address indicates an identification of a basic service set (BSS) of the wireless device.

In Example 49, the subject matter of Example 48 can optionally include means for generating the frame with a second part of the MAC address is a predetermined pattern, the second part of the MAC address is a formula applied to a first part of the MAC address, or an individual/group bit of the MAC address is set, if the wireless device is an access point.

In Example 50, the subject matter of Examples 48 or 49 can optionally include means for transmitting and receiving radio frequency signals.

In Example 51, the subject matter of Example 50 can optionally include means for transmitting the packet.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: memory; and processing circuitry coupled to the memory, the processing circuitry configured to:
    associate with an access point, wherein an address of the access point is a basic service set (BSS) identification (BSSID);
    decode a first portion of a first frame, wherein when the first portion of the first frame comprises a receiver address (RA) field, a transmitter address (TA) field, or a BSSID field, and when a value of the RA field, a value of the TA field, or a value of the BSSID field is equal to the value of the BSSID, determine the first frame is an intra-BSS frame, wherein the processing circuitry sets a value of a predetermined bit in the TA field to a predetermined value prior to determining if the value of the TA field is equal to the value of the BSSID; and
    generate a signal to cause the STA to wirelessly transmit a second frame that overlaps in time with a second portion of the first frame, when the first portion of the first frame indicates the first frame is not the intra-BSS frame and is an inter-BSS frame, and when a measured energy of received signals of the first portion of the first frame is below a power detect threshold for inter-BSS frames.

2. The apparatus of claim 1, herein the processing circuitry is further configured to:
    determine the first frame is the inter-BSS frame, when the first frame comprises the BSSID field and the value of the BSSID field is not the value of the BSSID, and when the value of the BSSID field is not the value of another BSS associated with the STA.

3. The apparatus of claim 1, wherein the processing circuitry is further configured to:
    determine the first frame is the inter-BSS frame, when the first frame comprises the TA field and the RA field, and when the value of the TA field and the value of the RA field is not the value of the BSSID, and when the value of the TA field and the value of the RA field is not the value of another BSS associated with the STA, wherein the processing circuitry sets a value of a predetermined bit in the TA field to a predetermined value prior to determining if the value of the TA field is equal to the value of the BSSID.

4. The apparatus of claim 1, wherein the value of the BSSID and the value of the BSSID field is a media access control (MAC) address.

5. The apparatus of claim 1, wherein the address of the BSS is a media access control (MAC) address of an access point of the BSS.

6. The apparatus of claim 1, wherein the power detect threshold is greater than a minimum power detect level.

7. The apparatus of claim 1, wherein the first frame is received on a first channel and the second frame is to be transmitted on the first channel.

8. The apparatus of claim 1, wherein the second frame is to be transmitted in accordance with one or both of orthogonal frequency division multiple access (OFDMA) and multiple-user multiple-input multiple-output (MU-MIMO).

9. The apparatus of claim 1, wherein the processing circuitry is further configured to:
    generate the signal to cause the STA to transmit a second frame that overlaps in time with a second portion of the first frame, when the first portion of the first frame indicates the first frame is not the intra-BSS frame and is an inter-BSS frame, and when a measured energy of received signals of the first portion of the first frame are below a power detect threshold for inter-BSS frames.

10. The apparatus of claim 1, wherein the processing circuitry is further configured to:
    determine the first frame is the inter-BSS frame, when the first frame comprises the TA field and the RA field, and when the value of the TA field and the value of the RA field is not the value of the first BSSID, and when the value of the TA field and the value of the RA field is not a value of a third BSSID of another BSS associated with the STA, wherein the processing circuitry forces the value of the individual/group bit in the TA field to 0 prior to a determination if the value of the TA field is equal to the value of the first BSSID.

11. The apparatus of claim 1, wherein the first frame comprises a color field, the color field indicating one or more other BSSs associated with the BSS.

12. The apparatus of claim 1, wherein the STA is one from the following group: an Institute of Electrical and Electronic Engineers (IEEE) 802.11ax access point, an IEEE 802.11ax station, a high-efficiency (HE) STA, an IEEE 802.11 station, and an IEEE 802.11 access point.

13. The apparatus of claim 1, further comprising: transceiver circuitry coupled to the processing circuitry; and one or more antennas coupled to the transceiver circuitry.

14. A non-transitory computer-readable storage medium that stores instructions for execution by one or more processors of an apparatus of a station (STA the instructions to configure the one or more processors to:
    associate with an access point, wherein an address of the access point is a basic service set (BSS) identification (BSSID);
    decode a first portion of a first frame, wherein when the first portion of the first frame comprises a receiver address (RA) field, a transmitter address (TA) field, or a BSSID field, and when a value of the RA field, a value of the TA field, or a value of the BSSID field is equal to the value of the BSSID, determine the first frame is an intra-BSS frame, wherein the processing circuitry sets a value of a predetermined bit in the TA field to a predetermined value prior to determining if the value of the TA field is equal to the value of the BSSID; and
    generate a signal to cause the STA to wirelessly transmit a second frame that overlaps in time with a second portion of the first frame, when the first portion of the first frame indicates the first frame is not the intra-BSS frame and is an inter-BSS frame, and when a measured energy of received signals of the first portion of the first frame is below a power detect threshold for inter-BSS frames.

15. The non-transitory computer-readable storage medium of claim 14, wherein the instructions to further configure the one or more processors to:
    determine the first frame is the inter-BSS frame, when the first frame comprises the BSSID field and the value of the BSSID field is not the value of the BSSID, and when the value of the BSSID field is not the value of another BSS associated with the STA.

16. The non-transitory computer-readable storage medium of claim 14, wherein the instructions to further configure the one or more processors to:
  determine the first frame is the inter-BSS frame, when the first frame comprises the TA field and the RA field, and when the value of the TA field and the value of the RA field is not the value of the BSSID, and when the value of the TA field and the value of the RA field is not the value of another BSS associated with the STA, wherein the processing circuitry sets a value of a predetermined bit in the TA field to a predetermined value prior to determining if the value of the TA field is equal to the value of the BSSID.

17. The non-transitory computer-readable storage medium of claim 14, wherein the value of the first BSSID and the value of the second BSSID field is a media access control (MAC) address.

18. A method performed by an apparatus of a station (STA), the method comprising:
  associating with an access point, wherein an address of the access point is a basic service set (BSS) identification (BSSID);
  decoding a first portion of a first frame, wherein when the first portion of the first frame comprises a receiver address (RA) field, a transmitter address (TA) field, or a BSSID field, and when a value of the RA field, a value of the TA field, or a value of the BSSID field is equal to the value of the BSSID, determine the first frame is an intra-BSS frame, wherein the processing circuitry sets a value of a predetermined bit in the TA field to a predetermined value prior to determining if the value of the TA field is equal to the value of the BSSID; and
  generating a signal to cause the STA to wirelessly transmit a second frame that overlaps in time with a second portion of the first frame, when the first portion of the first frame indicates the first frame is not the intra-BSS frame and is an inter-BSS frame, and when a measured energy of received signals of the first portion of the first frame is below a power detect threshold for inter-BSS frames.

19. The method of claim 18, wherein the method further comprises:
  determining the first frame is the inter-BSS frame, when the first frame comprises the second BSSID field and the value of the second BSSID field is not the value of the first BSSID, and when the value of the second BSSID field is not the value of another BSS associated with the STA.

* * * * *

UNITED STATES PATENT AND TRADEMARK OFFICE
CERTIFICATE OF CORRECTION

PATENT NO. : 10,206,246 B2
APPLICATION NO. : 15/918051
DATED : February 12, 2019
INVENTOR(S) : Huang et al.

Page 1 of 1

It is certified that error appears in the above-identified patent and that said Letters Patent is hereby corrected as shown below:

In the Claims

In Column 15, Line 34, in Claim 2, delete "herein" and insert --wherein-- therefor In Column 16, Line 36, in Claim 14, delete "(STA" and insert --(STA),-- therefor Signed and Sealed this
Twenty-eighth Day of April, 2020

Andrei Iancu
*Director of the United States Patent and Trademark Office*